(12) United States Patent
Cao et al.

(10) Patent No.: US 8,974,925 B1
(45) Date of Patent: Mar. 10, 2015

(54) GYPSUM BOARD

(71) Applicant: United States Gypsum Company, Chicago, IL (US)

(72) Inventors: Bangji Cao, Naperville, IL (US); Weixin D. Song, Vernon Hills, IL (US); Cesar Chan, Libertyville, IL (US); Scott Leckie, McHenry, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 14/054,620

(22) Filed: Oct. 15, 2013

(51) Int. Cl.
*B32B 13/00* (2006.01)
*E04B 1/94* (2006.01)
*E04B 2/28* (2006.01)

(52) U.S. Cl.
CPC . *E04B 1/94* (2013.01); *B32B 13/00* (2013.01); *E04B 2/28* (2013.01)
USPC ........................................ 428/703; 428/294.7

(58) Field of Classification Search
USPC ................. 428/294.7, 702, 703, 920
See application file for complete search history.

(56) References Cited

U.S. PATENT DOCUMENTS

| | | | |
|---|---|---|---|
| 4,600,634 A | 7/1986 | Langer | |
| 4,676,835 A | 6/1987 | Green et al. | |
| 4,722,858 A | 2/1988 | Harbourne et al. | |
| 4,784,897 A | 11/1988 | Brands et al. | |
| 5,001,005 A | 3/1991 | Blanpied | |
| 5,158,612 A | 10/1992 | Savoly et al. | |
| 5,240,639 A | 8/1993 | Diez et al. | |
| 5,401,588 A | 3/1995 | Garvey et al. | |
| 5,580,637 A | 12/1996 | Konta et al. | |
| 5,643,510 A | 7/1997 | Sucech | |
| 6,010,596 A | 1/2000 | Song | |
| 6,221,521 B1 * | 4/2001 | Lynn et al. | 428/703 |
| 6,394,279 B1 | 5/2002 | Doelle et al. | |
| 6,395,131 B1 | 5/2002 | Doelle et al. | |
| 6,425,982 B1 | 7/2002 | Cao et al. | |
| 6,589,389 B2 | 7/2003 | Cao et al. | |
| 6,699,364 B2 | 3/2004 | Song et al. | |
| 6,752,895 B1 | 6/2004 | Song et al. | |
| 6,808,793 B2 | 10/2004 | Randall et al. | |
| 6,941,720 B2 * | 9/2005 | DeFord et al. | 52/783.14 |
| 7,563,733 B2 | 7/2009 | Ahluwalia et al. | |
| 7,568,528 B1 | 8/2009 | Miller et al. | |
| 7,635,657 B2 | 12/2009 | Bland et al. | |
| 7,661,511 B2 | 2/2010 | Hasegawa et al. | |
| 7,731,794 B2 | 6/2010 | Yu et al. | |
| 7,736,720 B2 | 6/2010 | Yu et al. | |
| 7,771,851 B2 | 8/2010 | Song et al. | |
| 7,932,195 B2 | 4/2011 | Smith et al. | |
| 7,935,223 B2 | 5/2011 | Cao et al. | |

(Continued)

FOREIGN PATENT DOCUMENTS

| | | |
|---|---|---|
| DE | 3120342 A1 | 12/1982 |
| EP | 1022400 A1 | 7/2000 |

*Primary Examiner* — Brian Glessner
*Assistant Examiner* — Gisele Ford
(74) *Attorney, Agent, or Firm* — Leydig Voit & Mayer, Ltd.; Philip T. Petti; Pradip K. Sahu

(57) ABSTRACT

Described herein is a composite board and a method of producing a composite board, the board having increased fire endurance. The board comprises a sheet having a thickness greater than about 0.014 inches, and a thermal conductivity of about 0.1 w/(m.k.) or less. The composite board can be part of a wall assembly comprising two boards defining an interior cavity, the sheet facing the interior cavity.

23 Claims, 10 Drawing Sheets

(56) References Cited

U.S. PATENT DOCUMENTS

| | | |
|---|---|---|
| 7,989,370 B2 | 8/2011 | Currier et al. |
| 8,030,229 B2 | 10/2011 | Ahluwalia et al. |
| 8,030,377 B2 | 10/2011 | Dubey et al. |
| 8,038,790 B1 | 10/2011 | Dubey et al. |
| 8,062,565 B2 | 11/2011 | Mueller et al. |
| 8,062,741 B2 | 11/2011 | Tonyan et al. |
| 8,079,198 B2 * | 12/2011 | Tonyan et al. ............ 52/745.12 |
| 8,100,226 B2 | 1/2012 | Cao et al. |
| 8,118,928 B1 | 2/2012 | Yu et al. |
| 8,122,679 B2 * | 2/2012 | Tonyan et al. ............ 52/745.13 |
| 8,133,357 B2 | 3/2012 | Cao et al. |
| 8,197,952 B2 | 6/2012 | Yu et al. |
| 8,257,489 B2 | 9/2012 | Yu et al. |
| 8,262,820 B2 | 9/2012 | Yu et al. |
| 8,323,785 B2 | 12/2012 | Yu et al. |
| 8,383,233 B2 | 2/2013 | Palm et al. |
| RE44,070 E | 3/2013 | Yu et al. |
| 8,470,461 B2 | 6/2013 | Yu et al. |
| 8,475,762 B2 | 7/2013 | Li et al. |
| 2002/0009622 A1 * | 1/2002 | Goodson ................ 428/703 |
| 2002/0139082 A1 * | 10/2002 | DeFord et al. .............. 52/783.1 |
| 2003/0049450 A1 | 3/2003 | Song et al. |
| 2003/0056909 A1 | 3/2003 | Cao et al. |
| 2003/0089061 A1 * | 5/2003 | DeFord et al. .............. 52/309.9 |
| 2003/0175478 A1 | 9/2003 | Leclercq et al. |
| 2004/1021075 | 6/2004 | Grove et al. |
| 2004/1209074 | 10/2004 | Randall et al. |
| 2006/0278132 A1 | 12/2006 | Yu et al. |
| 2007/0197114 A1 | 8/2007 | Grove |
| 2008/0245012 A1 * | 10/2008 | Boisvert et al. ................ 52/408 |
| 2009/0239977 A1 | 9/2009 | Dubey et al. |
| 2009/0252941 A1 | 10/2009 | Mueller et al. |
| 2009/0253323 A1 | 10/2009 | Mueller et al. |
| 2009/0260918 A1 | 10/2009 | Cao et al. |
| 2010/0197182 A1 | 8/2010 | Barzilai |
| 2010/0229714 A1 | 9/2010 | Tonyan et al. |
| 2010/0320029 A1 | 12/2010 | Cao et al. |
| 2011/0147119 A1 | 6/2011 | Cao et al. |
| 2012/0024625 A1 | 2/2012 | Cao et al. |
| 2012/0164422 A1 | 6/2012 | Palm et al. |
| 2012/0168527 A1 | 7/2012 | Li et al. |
| 2012/0170403 A1 | 7/2012 | Li et al. |
| 2012/0219785 A1 | 8/2012 | Yu et al. |
| 2012/0308463 A1 | 12/2012 | Li et al. |
| 2013/0023612 A1 | 1/2013 | Lu et al. |
| 2013/0068364 A1 | 3/2013 | Yu et al. |
| 2013/0081554 A1 | 4/2013 | Cao |
| 2013/0098268 A1 | 4/2013 | Li et al. |
| 2013/0099027 A1 | 4/2013 | Li et al. |
| 2013/0099418 A1 | 4/2013 | Li et al. |
| 2013/0100759 A1 | 4/2013 | Wittbold et al. |
| 2013/0101838 A1 | 4/2013 | Yu et al. |
| 2013/0216762 A1 | 8/2013 | Chan et al. |

\* cited by examiner

GYPSUM BOARD

BACKGROUND OF THE INVENTION

Gypsum products can be manufactured using a slurry formed from at least water and stucco. The stucco, which is calcium sulfate hemihydrate ($CaSO_4 \cdot \tfrac{1}{2} H_2O$), reacts with water to form gypsum, which is calcium sulfate dihydrate ($CaSO_4 \cdot 2H_2O$). The two water molecules in crystallized gypsum are chemically bound to the calcium sulfate in what is often termed "crystallized water."

Gypsum wallboard is generally a composite board comprising a core 104, face sheet/liner 106, and back sheet/liner 108 (FIG. 1). In a wallboard assembly, the face sheet 114 of the wallboard is exposed to the exterior, and the back sheet 116 is placed inside a cavity defined by two wallboards (FIG. 2). Gypsum wallboards are commonly used in drywall construction of interior walls and ceilings, and should be able to withstand both fire and excessive temperatures. As a result, gypsum wallboards are manufactured using specifications that maximize fire endurance/resistance.

Fire endurance/resistance of gypsum wallboard is measured by the period for which a board can withstand a standard fire test. The fire resistance of a wallboard is classified according to the ability for a wallboard to avoid an increase in temperature, flame passage, and structural collapse. In order to have various parties, including constructors, occupants, and regulating bodies, evaluate the fire endurance on a common basis, fire test assemblies are categorized into several standard arrangements. Some common assemblies include test designs defined by Underwriters Laboratories, Inc. (UL®), a testing and certification agency, which has tests that are referred to as U305, U419, and U423.

A standard fire test is customarily conducted in accordance with the requirements of ASTM E119 (2009). In such tests, a fire resistance classification can be established based on the time at which a wall assembly shows excessive temperature rise, or passage of flame, or structural collapse. Failure of the test occurs when the average temperature as measured by several thermocouples on the unexposed surface increases more than 250° F. above ambient temperature, or any individual thermocouple rises more than 325° F. above ambient temperature. The duration of fire endurance of a system is not only dependent upon the gypsum board used in the system, but also depends upon many other factors, including wall assembly thickness, stud type and spacing, board size, insulation type, and others.

Although existing techniques are useful in extending wallboard fire endurance and resistance, further improvement is always desirable.

BRIEF SUMMARY OF THE INVENTION

In one aspect, the present invention provides a composite gypsum board comprising a core comprising set gypsum formed from at least water and stucco. The gypsum core has a substantially flat shape at a generally uniform thickness, and defines the first and second board faces in opposing relation. The gypsum core comprises a sheet disposed in bonding relation along the first board surface. The sheet is made of a material that has a thickness greater than about 0.014 inches, possesses a thermal conductivity that is less than about 0.1 w/(m.k.), and is applied to the back side of the finished board. The board has a dry weight of less than about 2000 lbs/1000 ft² when at a thickness of about % inch.

In another aspect, the present invention provides a method for making a composite gypsum board comprising a gypsum core comprising forming a mixture of at least stucco and water to make stucco slurry, disposing the stucco slurry between two cover sheets and forming a flat, relatively uniform layer to create a board perform, cutting the continuous board preform into a board of predetermined dimensions after the slurry has hardened sufficiently for cutting, and drying the board. At least one cover sheet (e.g., back cover sheet) has a thickness greater than about 0.014 inches, and a thermal conductivity lower than about 0.1 w/(m.k.). The board has a dry weight of less than about 2000 lbs/1000 ft² when at a thickness of about % inch.

In another aspect, the present invention provides a composite gypsum board which comprises a set gypsum core disposed between first and second cover sheets. The second cover sheet (e.g., back cover sheet) has a thickness greater than about 0.014 inches, and a thermal conductivity of about 0.1 w/(m.k.) or less. The board has a dry weight of less than about 2000 lbs/1000 ft² when at a thickness of about % inch. When the board is disposed in a fire endurance index test apparatus and the second cover sheet (e.g., back cover sheet) faces the door of the testing apparatus, the Fire Endurance Index (FEI) of the board is greater than about 50 minutes.

In another aspect, the composite gypsum board is produced by a method comprising forming a mixture of at least stucco and water to make a slurry, disposing the slurry between two cover sheets to form a board preform, cutting the board preform into a board of predetermined dimensions after the slurry has hardened sufficiently for cutting, and drying the board. At least one cover sheet (e.g., back cover sheet) has a thickness greater than about 0.014 inches and a thermal conductivity of about 0.1 w/(m.k.) or less. The board has a dry weight of less than about 2000 lbs/1000 ft² when at a thickness of about % inch. When the board is disposed in a fire endurance index test apparatus and the cover sheet that has a thickness greater than about 0.014 inches and a thermal conductivity of about 0.1 w/(m.k.) or less faces the door of the testing apparatus, the Fire Endurance Index (FEI) of the board is greater than about 50 minutes.

In another aspect, a wall assembly comprises a first board comprising a set gypsum core disposed between first and second cover sheets, with the first and second cover sheets defining first and second board faces in opposing relation. The second cover sheet (e.g., back sheet) has a thickness greater than about 0.014 inches, and a thermal conductivity of about 0.1 w/(m.k.) or less. The board has a dry weight of less than about 2000 lbs/1000 ft² when at a thickness of about % inch. A second board comprises a set gypsum core, the set gypsum core defining third and fourth board faces in opposing relation, with the third and fourth board faces each optionally in association with a cover sheet. The first and second boards define an interior cavity of the wall assembly, such that the second cover sheet faces the interior cavity.

These and other advantages of the present invention, as well as additional inventive features, will be apparent from the description that follows.

DETAILED DESCRIPTION OF THE INVENTION

Embodiments of the present invention are premised, at least in part, on the surprising and unexpected discovery that adding a thicker sheet to a gypsum core yields a wallboard with greater fire endurance. While cover sheets can act as an insulator, adding additional combustible material to a wallboard would be expected to yield a board of lower fire endurance. Surprisingly, it was discovered that a wallboard comprising a sheet of increased thickness and low thermal conductivity can increase the fire endurance of a wallboard. In general, the composite gypsum board of the present invention comprises a set gypsum core (e.g., comprising an interlocking matrix of set gypsum) disposed between a first cover sheet, which can be a face sheet, and a second cover sheet, which can be a back sheet. The second cover sheet (e.g., back cover sheet) has a thickness greater than about 0.014 inches, and a thermal conductivity of about 0.1 w/(m.k.) or less. It has been discovered that the additional material of low thermal conductivity, when facing the interior of a wallboard assembly, effectively lowers the heat transfer rate through the wallboard, into the cavity and, ultimately, through the second wallboard. This technique is an alternative to known fire retardant methods using, e.g., corrosive fire retardant materials, and affords a practical, cost-effective approach to increasing wallboard fire endurance.

Figure 1:
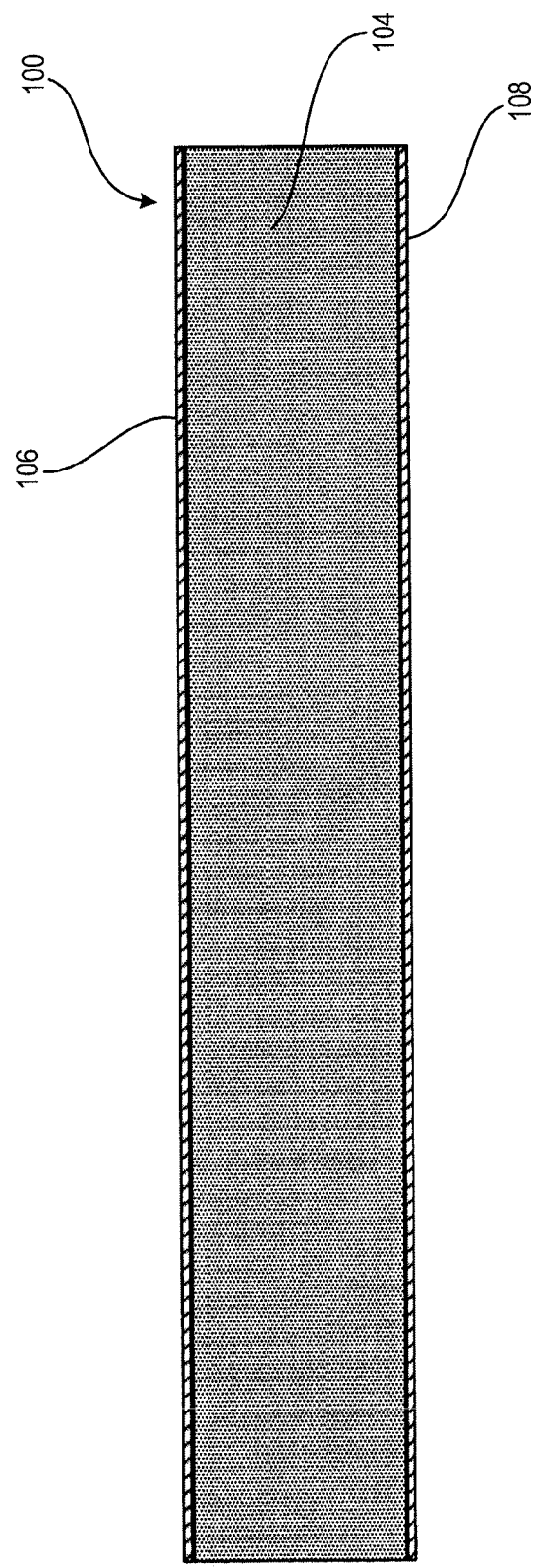
FIG. 1 is a diagram displaying a cross section of a gypsum composite board in accordance with embodiments of the invention.
Figure 2:
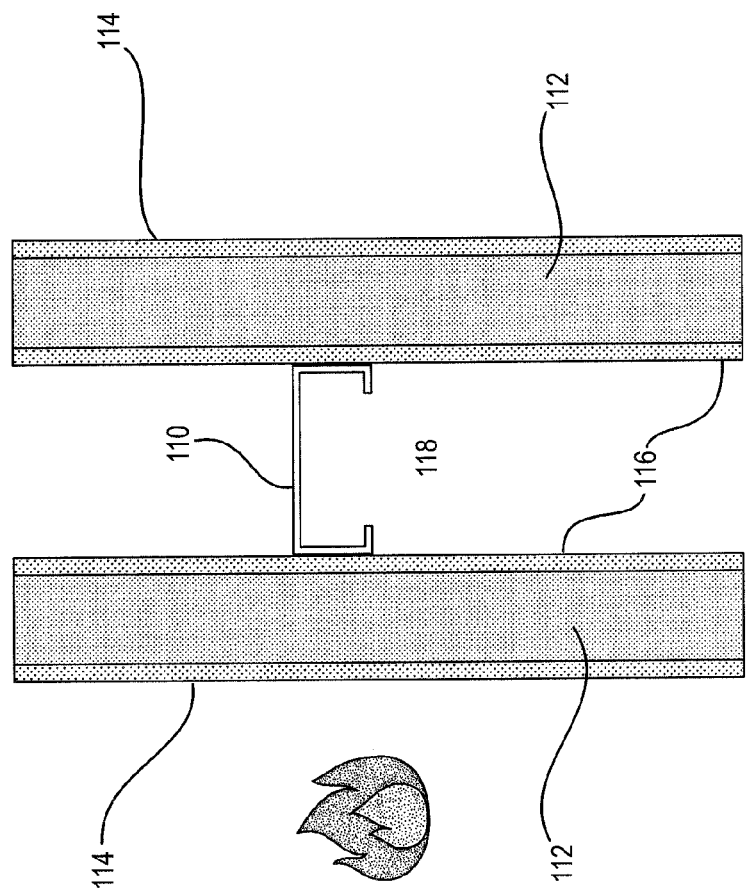
FIG. 2 is a diagram displaying a gypsum wallboard structure during a fire test in accordance with embodiments of the invention.

In some embodiments, the gypsum board is part of an assembly that comprises two composite boards connected by studs 110 (FIG. 2). The composite board itself can comprise a core 112, face sheet 114, and back sheet 116. The back sheet can be placed inside the cavity 118, such that during a fire outside the wall assembly, the back sheet faces away from the fire. In other words, the flames must pass through the face sheet 114 and the core 112 before reaching the back sheet. The back sheet helps increase the thermal resistance of the wallboard. The additional layer of back sheet can reduce the surface temperature on the back side of the exposed wallboard, which lengthens the fire endurance of the wallboard and can limit potential structural damage.

In general, when a gypsum wallboard is under thermal stress, thermal energy is initially directed to the evaporation of the calcium sulfate-bound water molecules. It is those two molecules of water that render gypsum highly resistant against heat. Upon reaching 215° F. water molecules are driven off, which leads to the formation of calcium sulfate hemihydrates ($CaSO_4 \cdot \frac{1}{2}H_2O$). When the temperature reaches 250° F., the remaining water is lost as gypsum is converted into calcium sulfate anhydrite. Both reactions are endothermic, meaning gypsum will absorb heat as it is "calcined" from dihydrate to anhydrite.

As gypsum is calcined, water molecules are lost and, unavoidably, the volume occupied by the gypsum is reduced. The amount of volumetric shrinkage can range about 5-10% and can be affected by impurities in the gypsum. The shrinkage of gypsum board can affect the fire endurance of gypsum boards. As wallboard shrinks, cracks may develop. These cracks allow heat to transfer through convection, accelerating the temperature rise through the wallboard. In some cases, cracking of unexposed wall may permit flame passage. Steel studs can exacerbate cracking as the differential expansion of metal studs can make a wall assembly deflect towards the fire side. As a result, the exposed wallboard is under tension, aiding the development of cracks. Various core additives can help avoid crack formation. These additives include chopped fiberglass, vermiculite, and siloxane. The presence of chopped fiberglass helps to uniformly distribute stress in the wallboard as a result of shrinkage, while the addition of vermiculite, which expands upon heating, may help to prevent wallboard shrinkage. In general, such additives may help maintain wallboard structural integrity during a fire.

In a wallboard test assembly, heat is transferred from the furnace to the surface of exposed board. As the surface temperature of the exposed wallboard increases, the temperature gradient across the board increases. If the wallboard maintains its structural integrity during a fire, it effectively blocks the passage of flame and hot air. As a result, the primary mode of heat transfer would be through conduction. The heat transfer rate during this stage would primarily depend upon the thermal conductivity of the wallboard. Inside the cavity formed between two wallboards in a wall assembly, heat can be transferred from one board to the other by convection and conduction. Convection occurs when air circulates inside the cavity. If insulation materials are placed inside the cavity, heat transfer is retarded. When metal studs are used in a wall assembly, a significant amount of heat can be transferred through the studs as its thermal conductivity is relatively high. When wood studs are used, such as in test assembly U305, heat transfer inside the cavity can be slowed.

Without wishing to be bound by theory, it is believed that the low thermal conductivity and hydrophilic characteristics of the second sheet (e.g., back sheet) of the present invention are responsible for the observed increase in fire endurance. When a fire occurs, the exposed sheet of the exposed wallboard can quickly burn off. However, the second sheet (e.g., back sheet) when facing the interior of the cavity of a wallboard assembly can remain on the gypsum core for an extended period because the gypsum core, which comprises crystallized water molecules, provides protection against heat. The presence of a low thermal conductivity sheet helps increase the thermal resistance of the exposed wallboard against heat transfer. The core and second sheet can jointly slow down heat transfer through the wallboard. Surprisingly, it has been found that as the thickness of the second sheet increases, the thermal resistance provided by the board increases, leading to improved fire endurance. In addition, the water released from calcination of the gypsum core can be re-adsorbed onto the hydrophilic sheet as water passes through the board. More thermal energy would be required to drive off the water, which can slow heat transfer further. In this manner, water can be conserved in the wallboard during a fire to extend its fire endurance. For the wallboard on the ambient side, i.e., the side of the wall assembly that is away from the fire, similar mechanisms may help slow down heat transfer. As the temperature increases, the second sheet (e.g., back sheet) of the board exposed to fire will eventually burn off, but only after it has extended the fire endurance of the wallboard assembly.

To prepare a board, a mixture of at least stucco and water in slurry form can be deposited between two sheets to form a board preform. At least one sheet, which can be the back sheet, can comprise cellulosic material, and has a low thermal conductivity. In general, at least one sheet can have a thickness greater than about 0.014 inches and a thermal conductivity of about 0.1 w/(m.k.) or less. In some embodiments, the board has a dry basis weight of 2000 lbs/MSF when at a thickness of ⅝ inch. In some embodiments, the cover sheets are bonded to the set gypsum core by a top and bottom high density bonding layer. When the core is sufficiently hardened, it can be cut into one or more desired sizes to form individual gypsum boards. The boards can be transferred into and passed through a kiln at temperatures sufficient to dry the panels to a desired moisture level. In some embodiments, an additional sheet can be added by lamination onto the back surface of the second sheet (e.g., back sheet), for example, using any suitable adhesive, such as 3M™ Super 77™ adhesive. These thicker sheets can be used alone or in conjunction with other fire endurance additives and methods when manufacturing wallboards.

In another embodiment, a composite gypsum board can be made by forming a mixture of at least stucco and water to make stucco slurry, depositing the gypsum stucco slurry on a back sheet and forming a flat, relatively uniform layer to create a board perform, wherein at least one sheet (e.g., back cover sheet) has a thickness greater than about 0.014 inches, a thermal conductivity lower than about 0.1 w/(m.k.), and wherein the sheet is disposed on a back side of the board facing away from the fire side when used in a board assembly, cutting the continuous board preform into a board of predetermined dimensions after the slurry has hardened sufficiently for cutting, and drying the board.

A wallboard of any thickness can be produced using the presently described methods and systems. The typical thickness of gypsum boards is ½ inch and ⅝ inch, but may range from ¼ inch to 1 inch. The total wallboard thickness is defined, e.g., as the combined thickness of the first sheet (if present), second sheet (e.g., back sheet), and the gypsum core. In embodiments of the invention, the wallboard thickness can be, e.g., as listed in Table 1A. In the table, an "X" represents the range "from about [corresponding value in top row] to about [corresponding value in left-most column]." The indicated values represent the thickness of a board in inches (Table 1A). For ease of presentation, it will be understood that each value represents "about" that value. For example, the first "X" in Table 1A is the range "from about 0.59 inches to about 0.6 inches." The ranges of the table are between and including the starting and endpoints.

TABLE 1A

| End Point for Wallboard Thickness | Starting Point for Wallboard Thickness (inches) | | | | | |
|---|---|---|---|---|---|---|
| (inches) | 0.59 | 0.6 | 0.61 | 0.62 | 0.63 | 0.64 |
| 0.6 | X | | | | | |
| 0.61 | X | X | | | | |
| 0.62 | X | X | X | | | |
| 0.63 | X | X | X | X | | |
| 0.64 | X | X | X | X | X | |
| 0.65 | X | X | X | X | X | X |

The cover sheets may comprise cellulosic fibers, glass fibers, ceramic fibers, mineral wool, or a combination of the aforementioned materials. The second sheet may comprise individual sheets or multiple sheets. The second sheet has a total thickness of at least about 0.014 inches. In some embodiments, it is preferred that there is a higher thickness, e.g., at least about 0.015 inches, at least about 0.016 inches, at least about 0.017 inches, at least about 0.018 inches, at least about 0.019 inches, at least about 0.020 inches, at least about 0.021 inches, at least about 0.022 inches, or at least about 0.023 inches. More preferably, the total second sheet thickness ranges from about 0.017 inches to about 0.023 inches. The total second sheet thickness refers to the sum of the thickness of each sheet attached to the gypsum board.

In embodiments of the invention, the thickness of the sheet can be, e.g., as listed in Table 1B below. In the table, an "X" represents the range "from about [corresponding value in top row] to about [corresponding value in left-most column]." The indicated values represent sheet thickness in inches. For ease of presentation, it will be understood that each value represents "about" that value. For example, the first "X" in Table 1B is the range "from about 0.014 inches to about 0.015 inches." The ranges of the tables are between and including the aforementioned starting and endpoints.

TABLE 1B

| End Point for Sheet Thickness | Starting Point for Sheet Thickness (inches) | | | | | | | | | |
|---|---|---|---|---|---|---|---|---|---|---|
| (inches) | 0.014 | 0.015 | 0.016 | 0.017 | 0.018 | 0.019 | 0.02 | 0.021 | 0.022 | 0.023 |
| 0.015 | X | | | | | | | | | |
| 0.016 | X | X | | | | | | | | |
| 0.017 | X | X | X | | | | | | | |
| 0.018 | X | X | X | X | | | | | | |
| 0.019 | X | X | X | X | X | | | | | |
| 0.02 | X | X | X | X | X | X | | | | |
| 0.021 | X | X | X | X | X | X | X | | | |
| 0.022 | X | X | X | X | X | X | X | X | | |

TABLE 1B-continued

| End Point for Sheet Thickness (inches) | Starting Point for Sheet Thickness (inches) | | | | | | | | | |
|---|---|---|---|---|---|---|---|---|---|---|
| | 0.014 | 0.015 | 0.016 | 0.017 | 0.018 | 0.019 | 0.02 | 0.021 | 0.022 | 0.023 |
| 0.023 | X | X | X | X | X | X | X | X | X | |
| 0.024 | X | X | X | X | X | X | X | X | X | X |

The thermal conductivity of the second sheet is less than about 0.1 w/(m.k.). More preferably, the thermal conductivity of the second sheet is less than about 0.05 w/(m.k.). In embodiments of the invention, the thermal conductivity of the sheet can be, e.g., as listed in Table 1C below. In the table, an "X" represents the range "from about [corresponding value in top row] to about [corresponding value in left-most column]." The indicated values represent thermal conductivity in w/(m.k.). For ease of presentation, it will be understood that each value represents "about" that value. For example, the first "X" in Table 1C is the range "from about 0 w/(m.k.) to about 0.01 w/(m.k.)." The ranges of the tables are between and including the aforementioned starting and endpoints.

TABLE 1C

| End Point for Thermal Conductivity Range (w/(m.k.)) | Starting Point for Thermal Conductivity Range (w/(m.k.)) | | | | | | | | | |
|---|---|---|---|---|---|---|---|---|---|---|
| | 0 | 0.01 | 0.02 | 0.03 | 0.04 | 0.05 | 0.06 | 0.07 | 0.08 | 0.09 |
| 0.01 | X | | | | | | | | | |
| 0.02 | X | X | | | | | | | | |
| 0.03 | X | X | X | | | | | | | |
| 0.04 | X | X | X | X | | | | | | |
| 0.05 | X | X | X | X | X | | | | | |
| 0.06 | X | X | X | X | X | X | | | | |
| 0.07 | X | X | X | X | X | X | X | | | |
| 0.08 | X | X | X | X | X | X | X | X | | |
| 0.09 | X | X | X | X | X | X | X | X | X | |
| 0.1 | X | X | X | X | X | X | X | X | X | X |

In preferred embodiments, the cover sheets comprises a cellulosic fiber. For example, paper sheet, such as Manila paper or kraft paper, can be used as the back sheet. Useful cover sheet paper includes Manila 7-ply and News-Line 5-ply, available from United States Gypsum Corporation, Chicago, Ill.; Grey-Back 3-ply and Manila Ivory 3-ply, available from Caraustar, Newport, Ind.; and Manila heavy paper and MH Manila HT (high tensile) paper, available from United States Gypsum Corporation, Chicago, Ill. An exemplary cover sheet paper is 5-ply NewsLine. In addition, the cellulosic paper can comprise any other material or combination of materials. For example, the second sheet can comprise glass fibers, ceramic fibers, mineral wool, or a combination of the aforementioned materials. The second sheet of the present invention is generally hydrophilic, meaning that the sheet is at least partially capable of adsorbing water molecules onto the surface of the sheet and/or absorbing water molecules into the sheet.

In other embodiments, the cover sheets be "substantially free" of glass fibers ceramic fibers, mineral wool, or a mixture thereof, which means that the cover sheets contain either (i) 0 wt. % based on the weight of the sheet, or no such glass fibers ceramic fibers, mineral wool, or a mixture thereof, or (ii) an ineffective or (iii) an immaterial amount of glass fibers ceramic fibers, mineral wool, or a mixture thereof. An example of an ineffective amount is an amount below the threshold amount to achieve the intended purpose of using glass fibers ceramic fibers, mineral wool, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % based on the weight stucco as one of ordinary skill in the art will appreciate. However, if desired in alternative embodiments, such ingredients can be included in the cover sheets.

Aluminum trihydrate, also known as alumina trihydrate and hydrated alumina, can increase fire resistance of gypsum wallboard due to its crystallized or compound water content. In some embodiments, ATH can be added in an amount from about 5% to about 30% by total weight of the sheet. ATH typically is very stable at room temperature. Above temperatures between about 180° C. and 205° C., ATH typically undergoes an endothermic decomposition releasing water vapor. The heat of decomposition for such ATH additives is greater than about 1000 Joule/gram, and in one embodiment is about 1170 Joule/gram. Without being bound by theory, it is believed that the ATH additive decomposes to release approximately 35% of the water of crystallization as water vapor when heated above 205° C. in accordance with the following equation: $Al(OH)_3 \rightarrow Al_2O_3 + 3H_2O$.

A cover sheet comprising inorganic particles of high water content, such as ATH, can increase fire endurance of a gypsum wallboard. The inorganic compound or mixture of compounds is incorporated into the sheet during manufacturing. Paper comprising ATH can be prepared by first diluting cellulosic fiber in water at about 1% consistency, then mixing with ATH particles at a predetermined ratio. The mixture can be poured into a mold, the bottom of which can have a wire mesh to drain off water. After draining, fiber and ATH particles are retained on the wire. The wet sheet can be transferred to a blotter paper and dried at about 200-360° F.

In one embodiment, the cover sheets can comprise any suitable amount of inorganic compound or mixture of inorganic compounds that adequately imparts greater fire endurance. The cover sheets can comprise any inorganic compound or mixture of inorganic compounds with high crystallized water content, or any compound that releases water upon heating. In a preferred embodiment, the amount of inorganic compound or the total mixture of inorganic compounds in the sheet ranges from about 0.1% to about 30% by weight of the sheet. The inorganic compound or inorganic compounds used in the sheet may be of any suitable particle size or suitable particle size distribution. In embodiments of the invention, the percentage of inorganic compound or mixture of inorganic compounds (e.g. ATH) by the total weight of the sheet can be, e.g., as listed in Table 1D below. In the table, an "X" represents the range "from about [corresponding value in top row] to about [corresponding value in left-most column]." The indicated values represent the percentage of inorganic compound or mixture of inorganic compounds by the total weight of the sheet. For ease of presentation, it will be understood that each value represents "about" that value. For example, the first "X" in Table 1D is the range "from about 0 wt % to about 0.1 wt %." The ranges of the tables are between and including the aforementioned starting and endpoints.

TABLE 1D

| End Point for Inorganic Compound(s) (%) Range | Starting Point for Inorganic Compound(s) Range (%) | | | | | | | | |
|---|---|---|---|---|---|---|---|---|---|
| | 0 | 0.1 | 0.5 | 1 | 2 | 5 | 10 | 15 | 20 | 25 |
| 0.1 | X | | | | | | | | | |
| 0.5 | X | X | | | | | | | | |
| 1 | X | X | X | | | | | | | |
| 2 | X | X | X | X | | | | | | |
| 5 | X | X | X | X | X | | | | | |
| 10 | X | X | X | X | X | X | | | | |
| 15 | X | X | X | X | X | X | X | | | |
| 20 | X | X | X | X | X | X | X | X | | |
| 25 | X | X | X | X | X | X | X | X | X | |
| 30 | X | X | X | X | X | X | X | X | X | X |

In some embodiments, e.g., ATH particles of less than about 20 μm are preferred, but any suitable source or grade of ATH can be used. For example, ATH can be obtained from commercial suppliers such as Huber under the brand names SB 432 (10 μm) or Hydral® 710 (1 μm).

In other embodiments, the cover sheet may comprise magnesium hydroxide. In these embodiments, the magnesium hydroxide additive preferably has a heat of decomposition greater than about 1000 Joule/gram, such as about 1350 Joule/gram, at or above 180° C. to 205° C. In such embodiments, any suitable magnesium hydroxide can be used, such as that commercially available from suppliers, including Akrochem Corp. of Akron, Ohio.

In other embodiments, the cover sheets be "substantially free" of inorganic compounds such as ATH, magnesium hydroxide, or a mixture thereof, which means that the cover sheets contain either (i) 0 wt. % based on the weight of the sheet, or no such inorganic compounds such as ATH, magnesium hydroxide, or a mixture thereof, or (ii) an ineffective or (iii) an immaterial amount of inorganic compounds such as ATH, magnesium hydroxide, or a mixture thereof. An example of an ineffective amount is an amount below the threshold amount to achieve the intended purpose of using inorganic compounds such as ATH, magnesium hydroxide, or a mixture thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % based on the weight of stucco as one of ordinary skill in the art will appreciate. However, if desired in alternative embodiments, such ingredients can be included in the cover sheets.

In embodiments where the core is sandwiched between two sheets, the cover sheets may comprise identical materials or materials with different properties. For embodiments in which multiple second sheets are used, the multiple sheets may comprise identical materials or materials with different properties.

The present invention can be practiced employing compositions and methods similar to those employed in the art to prepare various set gypsum-containing products. In the core, the stucco (or calcined gypsum) component used to form the crystalline matrix typically comprises, consists essentially of, or consists of beta calcium sulfate hemihydrate, water-soluble calcium sulfate anhydrite, alpha calcium sulfate hemihydrate, or mixtures of any or all of these, from natural or synthetic sources. In some embodiments, the stucco may include non-gypsum minerals, such as minor amounts of clays or other components that are associated with the gypsum source or are added during the calcination, processing and/or delivery.

The gypsum core may comprise conventional additives in the practice of the invention in customary amounts to impart desirable properties and to facilitate manufacturing, such as, for example, suitable starches, aqueous foam, leveling or nonleveling agents, set accelerators, set retarders, recalcination inhibitors, binders, adhesives, dispersing aids, thickeners, bactericides, fungicides, pH adjusters, colorants, reinforcing materials, fire retardants, water repellants, fillers, dimensional strengtheners, and mixtures thereof. In addition, the gypsum core can comprise additives such as phosphonic and/or phosphonate compounds, phosphoric and/or phosphate compounds, carboxylic and/or carboxylate compounds, boric and/or borate compounds, and mixtures thereof.

The current trend in the industry is towards gypsum wallboard of a lighter weight and lower density. A low basis weight can be achieved by mixing stucco slurry with a pre-determined amount of foam based upon target basis weight where the second sheet provides the fire endurance disclosed therein. As the board contains less gypsum per unit volume, there is less crystallized water available for fire endurance of the wallboard. In addition, the percent shrinkage can increase as the board density decreases. Both factors make it increasingly difficult to pass a fire test. The present invention can provide high fire endurance for lightweight gypsum board. In preferred embodiments, the board, at a thickness of about % inch, has a basis weight of less than about 2000 lbs/1000 ft². In other preferred embodiments, the board, at a thickness of about % inch, has a basis weight of less than about 1750 lbs/1000 ft². The wallboard of the present invention may be of any basis weight where the second sheet provides the fire endurance as disclosed herein. In lightweight embodiments in accordance with the present invention, a foaming agent is employed to yield voids in the set known to be useful in preparing foamed set gypsum products. Many such foaming agents are well known and readily available commercially, e.g., from GEO Specialty Chemicals in Ambler, Pa. For further descriptions of useful foaming agents, see, for example: U.S. Pat. Nos. 4,676,835, 5,158,612, 5,240,639, and 5,643, 510, which are, with regard to foaming agents, hereby incorporated by reference.

In some embodiments, the stucco slurry comprises about 2-4% vermiculite, about 0.5-5.0% starch, about 0.2-0.4% chopped fiberglass strands, about 0.2-3.0% ground gypsum powder, about 0.2-2.0% phosphate compounds, and about 0.01-0.1% dispersant. The starch can be of any type. For example, the starch can be pregelatinized, gelatinized in situ in the slurry, or acid-modified.

In some embodiments, assemblies can be constructed, using gypsum boards formed according to principles of the present invention, that conform to the specification of Underwriters Laboratories, Inc. (UL®) assemblies, such as U419, U305, and U423. The face of one side of the assembly can be exposed to increasing temperatures for a period of time in accordance with a heating curve, such as those discussed in the ASTM E119 procedures (e.g., ASTM E119-09a (2009)). The temperatures proximate the heated side and the temperatures at the surface of the unheated side of the assembly are monitored during the tests to evaluate the temperatures experienced by the exposed gypsum panels and the heat transmitted through the assembly to the unexposed panels. One useful indicator of the fire performance of gypsum panels in assemblies, for example those utilizing loaded, wood stud frames as called for in the ASTM E119 (2009) fire tests, is discussed in the article Shipp, P. H., and Yu, Q., "Thermophysical Characterization of Type X Special Fire Resistant Gypsum Board," *Proceedings of the Fire and Materials* 2011 *Conference*, San Francisco, 31st January-2nd February 2011, Interscience Communications Ltd., London, UK, pp. 417-426. The article discusses an extensive series of E119 fire tests of load bearing wood framed wall assemblies and their expected performance under the E119 fire test procedures. U.S. Pat. No. 8,323,785 is incorporated by reference herein with regard to ASTM E119 (2009).

In some embodiments, an assembly of gypsum boards formed according to principles of the present invention and in accordance with the specification of a U419 assembly, with or without cavity insulation, has a fire rating of at least about 60 minutes when heated in accordance with the time-temperature curve of ASTM standard E119-09 (2009). In some embodiments, an assembly of gypsum boards formed according to principles of the present invention and in accordance with the specification of a U305 assembly has a fire rating of at least about 55 minutes when heated in accordance with the time-temperature curve of ASTM standard E119-09 (2009). In some embodiments, an assembly of gypsum boards formed according to principles of the present invention and in accordance with the specification of a U305 assembly has a fire rating of at least about 60 minutes when heated in accordance with the time-temperature curve of ASTM standard E119-09 (2009). In some embodiments, an assembly of gypsum boards formed according to principles of the present invention and in accordance with the specification of a U423 assembly has a fire rating of at least about 60 minutes when heated in accordance with the time-temperature curve of ASTM standard E119-09 (2009).

In addition to common testing methods, the utility of the present invention to increase fire endurance can be analyzed using a small-scale fire endurance index (FEI) test. The FEI test is a small scale testing apparatus and method developed as an alternative to typical large scale wallboard testing. Fire endurance ratings are typically obtained by performing a full-size (at 100 ft$^2$ of wall area) fire test in a certified fire test laboratory per ASTM standards, which is time-consuming, expensive, and unsuitable for bench-top studies and quality control.

Figure 3:
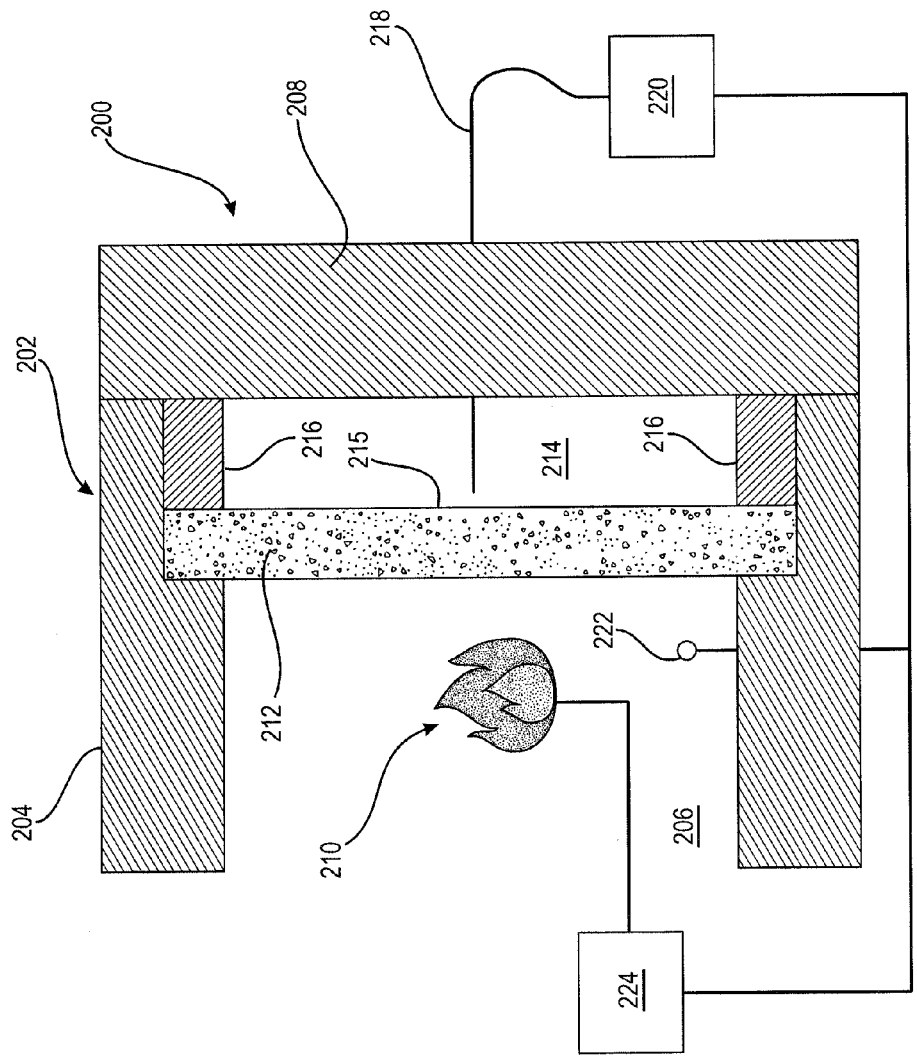
FIG. 3 is a diagram displaying the structure of the small scale test device used to determine the Fire Endurance Index (FEI) of a wallboard sample in accordance with embodiments of the invention.

A schematic diagram of a testing system 200 is shown, in cross section, in FIG. 3. The testing system 200 includes a muffle furnace 202 having an enclosure 204 forming a furnace chamber 206. The chamber 206 is closeable with a door 208 and includes a heat source 210 therewithin. The heat source 210 may be any known type of heat source such as a fuel-fired combustor or an electric-resistive heater, which operates to create a generally uniformly distributed temperature profile within the chamber 206.

In the illustration of FIG. 3, a board sample 212 is shown disposed within the furnace chamber 206 during a test. The sample 212 is mounted vertically within the chamber 206 in the illustrated embodiment at an offset distance from a door opening such that a gap 214 is formed between a back face 215 of the sample 212 and an oven-facing side of the door 208. Spacers 216 are disposed at a distance from one another between the sample 212 and the door 208 to simulate studs that space apart wallboards in a finished wall assembly. Although the gap 214 is shown empty, in an alternative embodiment the gap 214 may be filled with a wall-insulation material. Moreover, metal or wooden studs may be used in place of the spacers 216. The spacers may be connected to the sample 212 and, in certain embodiments, may be subjected to a compressive load along with the sample 212 to simulate a load-bearing wall.

A thermocouple 218 or other temperature-sensing device is connected close to the back face 215 of the sample during testing. The back face 215 is thicker than the front face of the sample. The thermocouple 218 has a sensing tip at a small distance from the surface of the sample 212. In alternative embodiments, the sending tip can touch or be within the sample 212. The thermocouple 218 is configured to sense a surface temperature or a temperature near the surface of the back face of the sample 212 during testing. The thermocouple 218 is connected to a data acquisition unit 220, which operates to provide power to the thermocouple 218, receive information therefrom indicative of the surface temperature of the sample 212, record the temperature information and, optionally or with the aid of a computer (not shown), plot the temperature information over time or otherwise analyze the information numerically.

When a test is conducted, the temperature of the muffle furnace chamber 206 is gradually increased over time by appropriately controlling the intensity of the heat source 210. In one embodiment, a furnace temperature sensor 222 is disposed to measure the temperature of the furnace chamber 206, provide information indicative of the furnace chamber temperature to a heater controller 224 and, optionally, also to the data acquisition unit 220. The heater controller 224 may operate in a closed loop fashion based on the information provided by the sensor 222 to provide a predetermined heating profile for the chamber 206 by appropriately and automatically adjusting the intensity of the heat source 210. The temperature rise of the chamber 206 may also optionally be recorded by the data acquisition unit 220 for establishing testing integrity.

Figure 4:
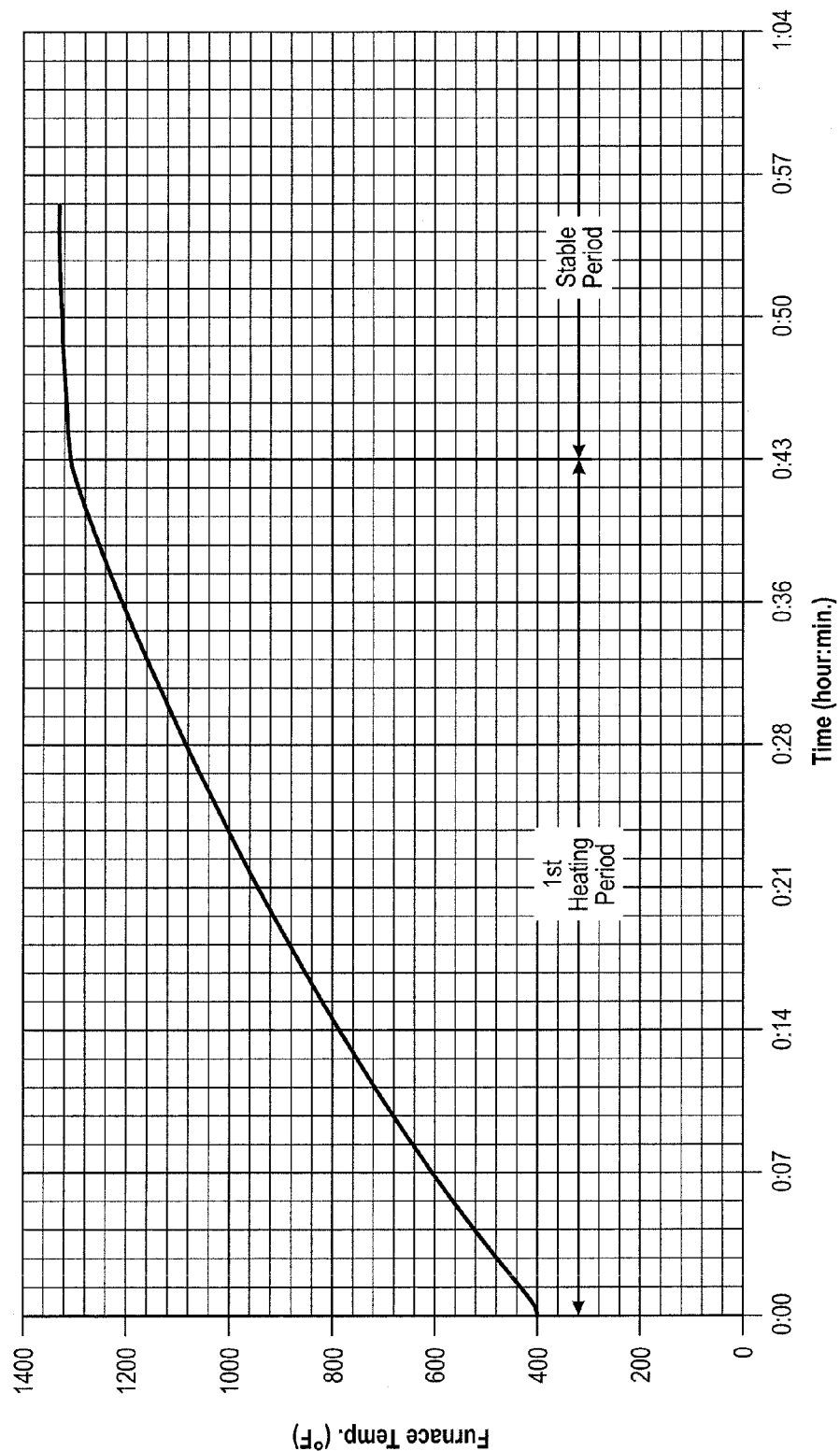
FIG. 4 is a line graph displaying the temperature profile (Y-axis) over time (X-axis) of a furnace used during the small scale fire test illustrated in FIG. 3, in accordance with embodiments of the invention.

A sample heating profile of the furnace chamber is shown in the time plot of FIG. 4. As can be seen from the plot, where a desired chamber temperature (deg. F) is plotted along the vertical axis and time (min.) is plotted along the horizontal axis, the chamber 206 is heated gradually following a logarithmic trend for about the first 43 minutes of the test from a temperature of about 400° F. to a temperature of about 1,423° F., and is maintained at that temperature for the remainder of the test, which in the illustrated graph continues for about 1 hour. Thus, the test is conducted over a first heating period, and then continues over a stable period, as marked on the graph of FIG. 4.

It has been determined that heat transfer through the sample 212 during a test, as gleaned by the measured surface temperature on the back face 215 of the sample, is concomitant to and indicative of the expected heat transfer through a wallboard in a full scale fire test. In essence, the test describes herein determines the rate of heat transfer through the sample. In one embodiment, temperature readings taken on both sides of the board can be used to estimate, in real time, the heat transfer rate through the board. By comparing the heat transfer curves of different products and correlating the curves to their actual fire test results, judgment and prediction of the performance of fire endurance of different products are advantageously enabled. In the test setup shown in FIG. 3, sample dimension was selected to be a rectangular sample having dimensions of 6.125"×6.625" and a thickness of 0.625". The depth of the cavity 214 was ⅞", and the thermocouple 218 was located in the geometrical center of the door 208, where the sensing probe of the thermocouple 218 protruded about ¹¹⁄₁₆" from the inside surface of the door 208 in the direction of the sample 212. In this way, the tip of the thermocouple was ³⁄₁₆" away from the surface of the sample. A glass wool frame was placed against the sample to act as the spacer 216 and keep the sample in place while also sealing the door frame against heat leakage. For half-inch thick samples, a metal frame of 0.125" thickness can be placed behind the sample to maintain the gap between the thermocouple and the sample and preserve the remaining test setup. The controller 224 of the muffle furnace was set to run from 200° C. to 773° C. The actual temperature curve of the muffle furnace at the front end is shown in FIG. 4.

Figure 5:
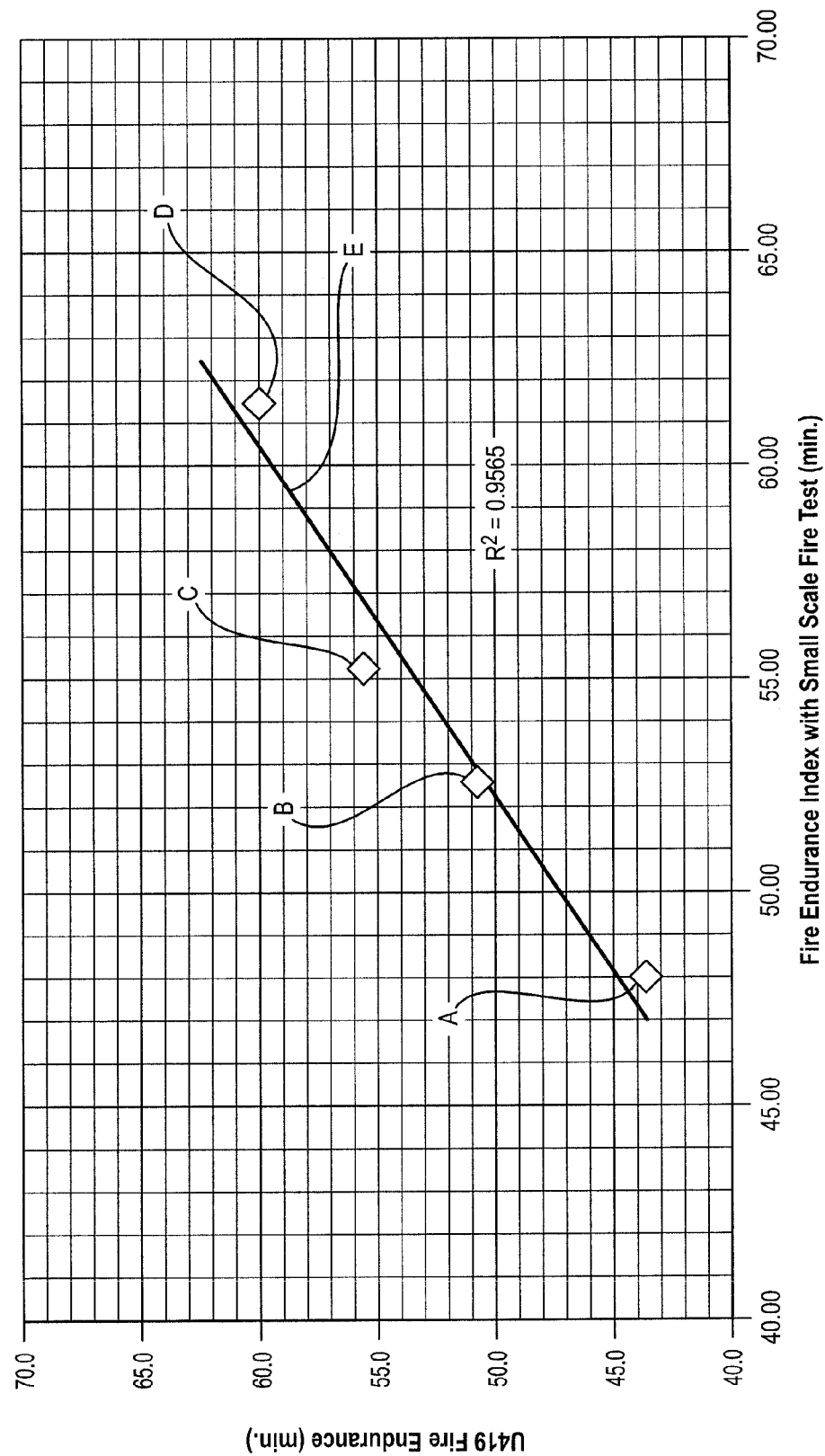
FIG. 5 is a line graph displaying a correlation between fire endurance of U419 test (Y-axis) and fire endurance of small-scale test of FIG. 3 (X-axis) in accordance with embodiments of the invention.

The test provides a temperature-time curve for a specific board sample. Fire Endurance Index (FEI) can be determined from the curve. Fire Endurance Index is defined as the time required to reach 600° F. at the backside of a test specimen in the small scale fire test. Data points A, B, C, and D are plotted, and the correlation between FEI and fire endurance time from U419 full-size fire test is shown in FIG. 5. Other designs of fire test assembly such as U305 and U423 can be extrapolated from FEI as well.

In some embodiments, the composite gypsum board of the present invention has a Fire Endurance Index (FEI) greater than 52 minutes and at least 3 minutes greater than a board comprising a sheet with a thickness less than about 0.014 inches. In some embodiments, the composite gypsum board of the present invention has a Fire Endurance Index (FEI) greater than 52 minutes and at least 4 minutes greater than a board comprising a sheet with a thickness less than about 0.014 inches.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein. The following examples further illustrate the invention but, of course, should not be construed as in any way limiting its scope.

Example 1

Effect of Thicker Sheet on Heat Transfer Across the Cavity

This Example demonstrates the effect of the sheet on heat transfer across the cavity of a U419 test assembly having no insulation in the cavity. For these tests, the surface temperature of the surface of the exposed wallboard inside the cavity and the temperature gradient across the cavity, which are indicative of heat transfer through the board during a test, were monitored and recorded. The temperature gradient across the cavity is defined as the temperature difference between the back sheet surface of the exposed board and the back sheet surface of the non-exposed board. Accordingly, a control board (sample A) and a board with a thicker sheet (sample B) were tested in a full scale test using a wall assembly of U419, with the thicker sheet facing the interior cavity. The boards and sheets were produced at a plant with the additives listed in Table 2 and with a water-to-stucco ratio of 0.91. Samples A and B had cellulosic paper with a thickness of 0.011 inches with a basis weight of 39 lbs/1000 ft$^2$. An additional layer of cellulosic paper sheet having a thickness of 0.011 inches and a basis weight of 40 lbs/1000 ft$^2$ was applied to Sample B. Sample B had a total sheet thickness of 0.022 inches and total sheet basis weight of 79 lbs/1000 ft$^2$. The two boards used in the assembly were of the same weight and composition.

TABLE 2

| Additive | wt % based on weight of stucco |
|---|---|
| Glass Fiber (Johns Manville, Denver, CO) | 0.27 |
| Vermiculite (Virginia Vermiculite LLC, Louisa, VA) | 3.84 |
| Diloflo Dispersant (Geo Specialty Chemicals, Cleveland, OH) | 0.05 |
| Ground Gypsum Powder | 1.03 |
| Starch (Bunge Milling, St. Louis, MO) | 1.60 |
| Phosphate (ICL Performance Products LP, St. Louis, MO) | 1.08 |

Figure 6:
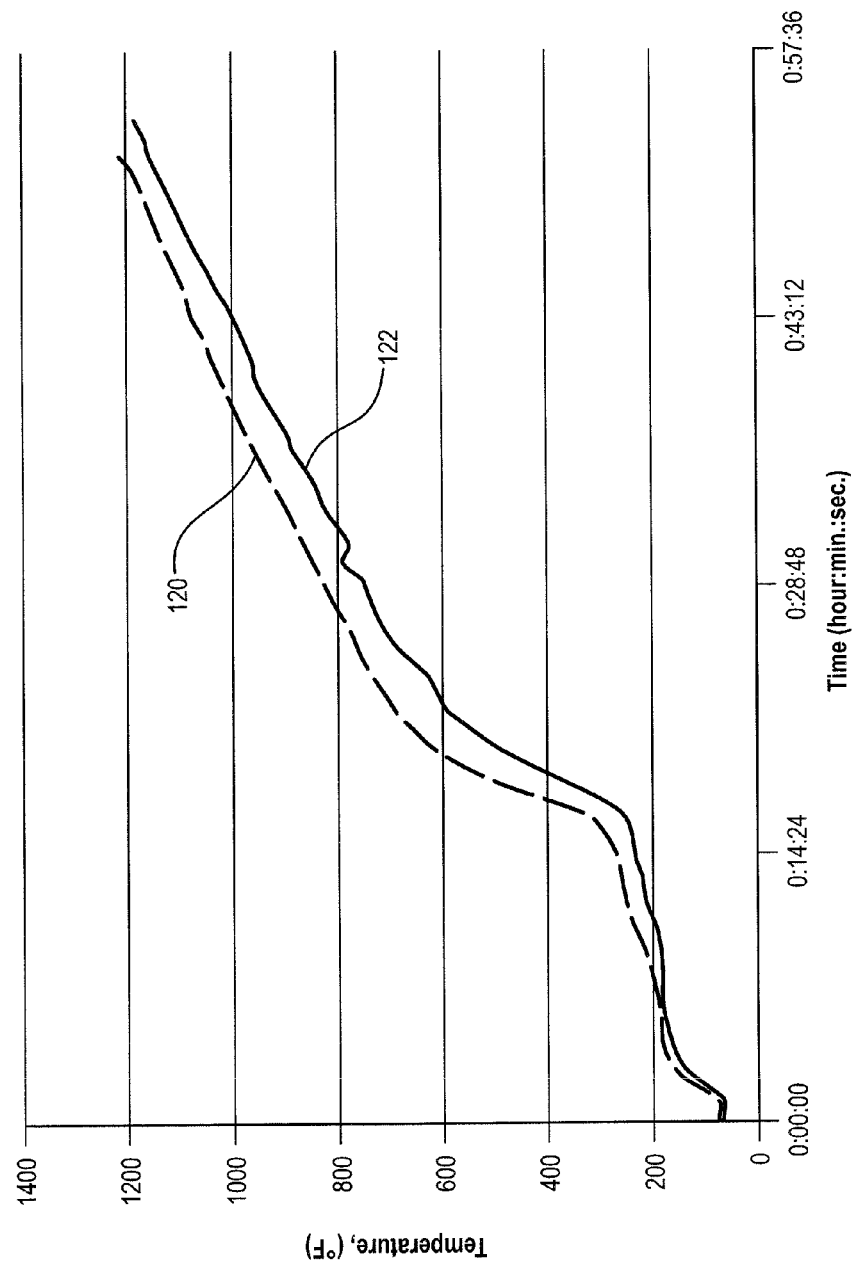
FIG. 6 is a line graph displaying surface temperatures (Y-axis) of exposed wallboard inside a cavity over time (X-axis) for wallboards of Example 1 during a standard fire test in accordance with embodiments of the invention.
Figure 7:
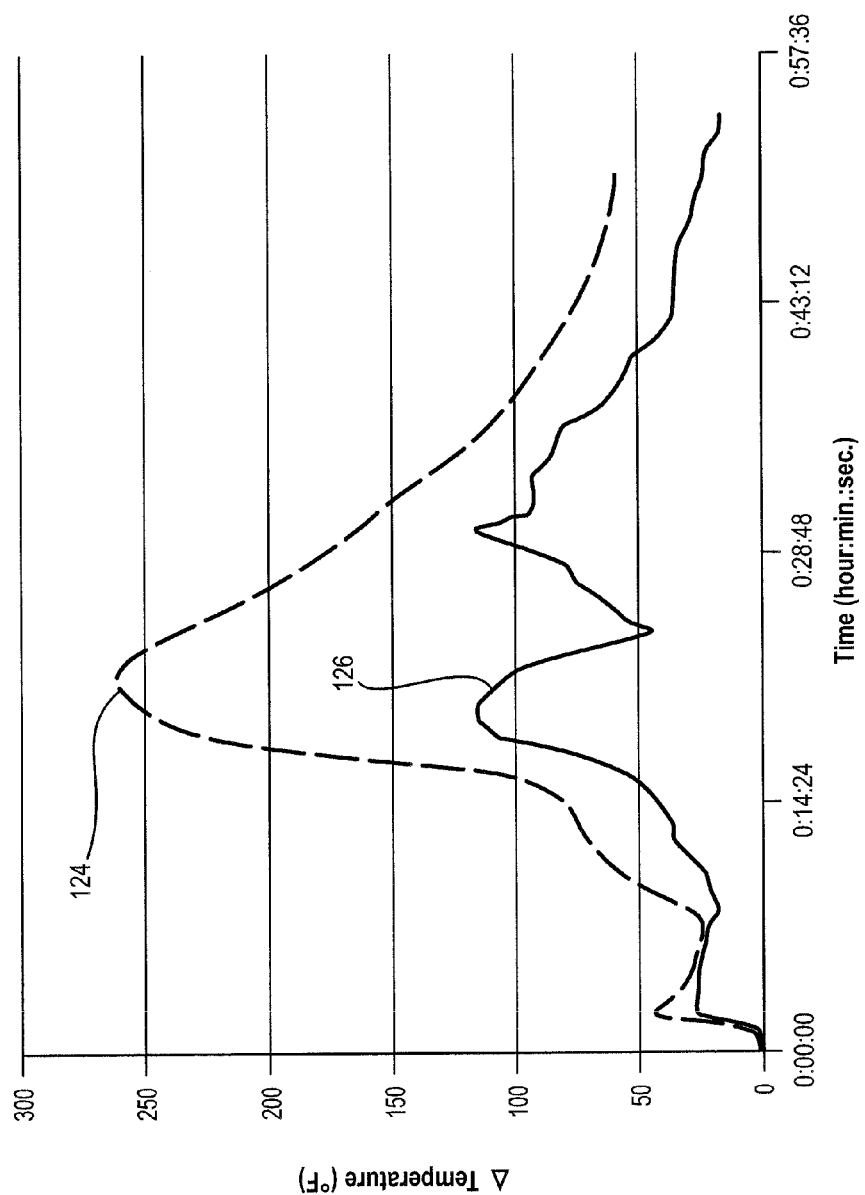
FIG. 7 is a line graph displaying temperature gradient (Y-axis) across a cavity over time (X-axis) for wallboards of Example 1 during a standard fire test in accordance with embodiments of the invention.

The samples were heated according to ASTM E119-09 (2009). The temperature profile of the surface of the wallboard exposed to fire inside the cavity of the test wall assembly, and the temperature gradient across the cavity, were then plotted in the graphs shown in FIGS. 6 and 7. The temperature trace for Samples A and B are shown in FIG. 6, where time is plotted along the horizontal axis and the cavity temperature for each sample is plotted along the vertical axis. In FIG. 6, a dashed-line curve 120 represents the temperature trace for the control (Sample A), and a solid-line curve 122 represents the temperature trace for Sample B. The temperature gradient across both samples is shown in FIG. 7. In FIG. 7, a dashed-line curve 124 represents the temperature gradient trace for the control (Sample A), and a solid-line curve 126 represents the temperature gradient trace for the board comprising a thicker sheet (Sample B).

This Example demonstrates that the presence of an additional layer of sheet effectively reduced the surface temperature during the test on the back side of the exposed wallboard facing the cavity, indicating a slower heat transfer rate. Because the surface temperature on the heated side of the cavity is reduced, the temperature gradient across the cavity is also effectively reduced (FIG. 7). Consequently, reaching the failure temperature on the surface of wallboard on the ambient side is delayed, which increases the fire endurance of the wallboard assembly.

Example 2

Effect of Sheet Thickness on Fire Endurance

This Example demonstrates the effect of sheet thickness on the fire endurance of a wallboard. A control board (sample C) and a board with a thicker sheet (sample D) were tested using the Fire Endurance Index (FEI) small-scale testing device described above relative to FIG. 3. A board (4 ft×10 ft) was produced at a plant with the additives listed in Table 3, a water-to-stucco ratio of 0.91, a thickness of 0.617 inches, a basis weight of 1681 lbs/1000 ft$^2$, and a density of 32.72 lbs/ft$^3$. The board had cellulosic paper with a thickness of 0.012 inches and a basis weight of 42 lbs/1000 ft$^2$. The board was cut into samples of 6.625 inches×6.125 inches. To make sample D, an additional layer of cellulosic sheet having a thickness of 0.011 inches and a basis weight of 39 lbs/1000 ft$^2$ was laminated onto one of the cut boards using 3M™ Super 77™ adhesive. After lamination, the sheet of sample D had a total thickness of 0.023 inches and basis weight of 81 lbs/1000 ft$^2$. The amount of adhesive applied was approximately 3 lbs/1000 ft$^2$. The sheets had a thermal conductivity of 0.05 w/(m.k).

TABLE 3

| Additive | wt % based on weight of stucco |
|---|---|
| Glass Fiber (Johns Manville, Denver, CO) | 0.27 |
| Diloflo Dispersant (Geo Specialty Chemicals, Cleveland, OH) | 0.05 |
| Ground Gypsum Powder | 1.03 |
| Starch (Bunge Milling, St. Louis, MO) | 1.60 |
| Phosphate (ICL Performance Products LP, St. Louis, MO) | 1.08 |

Figure 8:
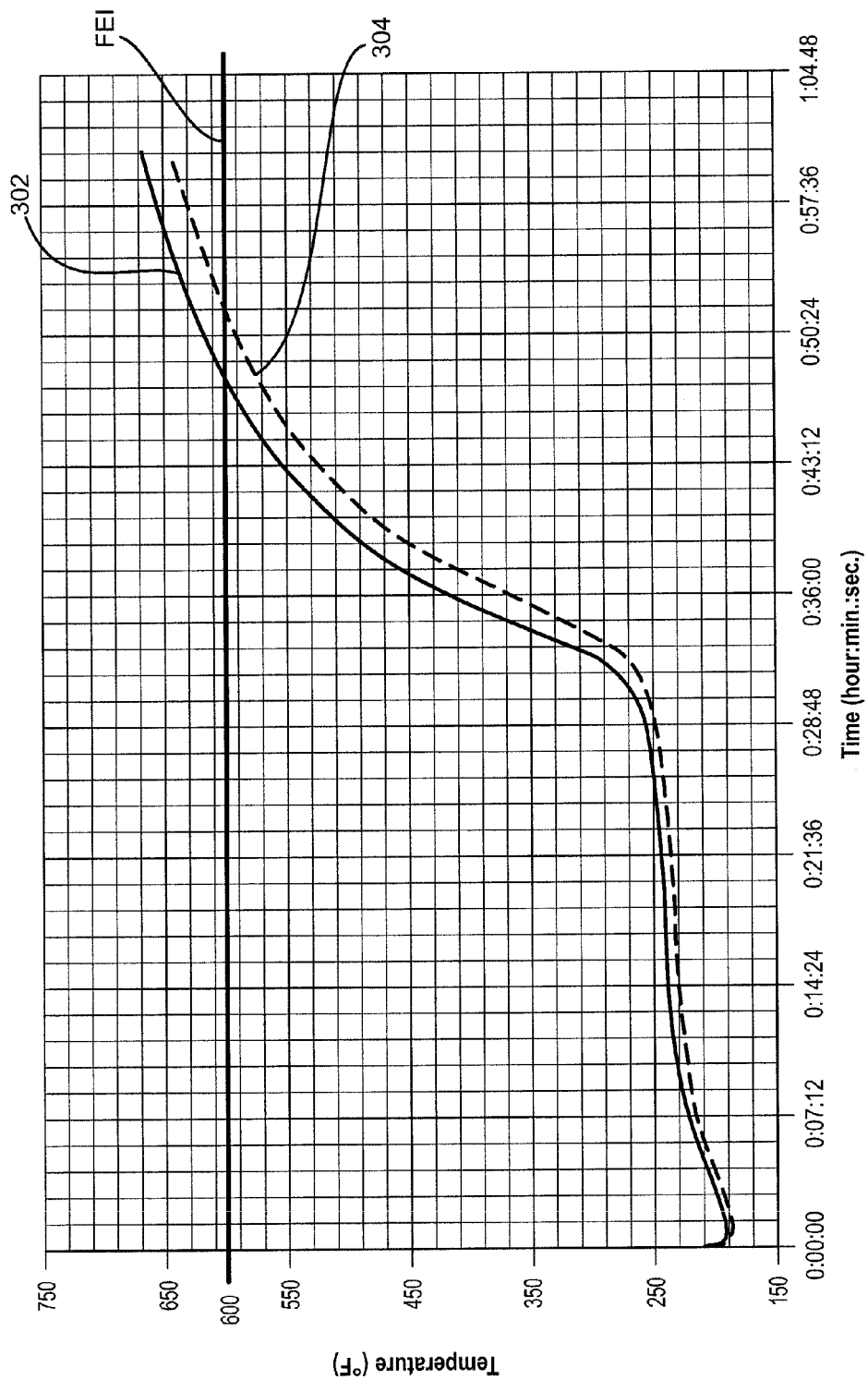
FIG. 8 is a line graph displaying the temperature of wallboard (Y-axis) over time (X-axis) for wallboards of Example 2 during a small-scale fire test in accordance with embodiments of the invention.

After the boards were allowed to condition at ambient conditions for at least 24 hours, the boards were individually tested in the small-scale device (FIG. 3) to determine their respective FEI values. The cover sheet was faced the door of the testing apparatus. Temperature traces for each of the two samples are shown in FIG. 8, where time is plotted along the horizontal axis and temperature of the back-face of each sample is plotted along the vertical axis. In the graph of FIG. 8, the solid line 302 represents the temperature trace for the control (sample C), the dashed line 304 represents the temperature trace for sample D, and a "FEI" line extends horizontally from a temperature of 315.6° C. (600° F.) to denote the FEI indexes for both samples.

As can be calculated from the graph of FIG. 8, the Fire Endurance Index was 48.0 minutes for the control sample (sample C) and 52.0 minutes for sample D. The increase in fire endurance time was 4.0 minutes when an additional layer of cellulosic sheet of 0.011 inches thickness was added to the wallboard.

Example 3

Fire Endurance of Sheets Comprising ATH

This Example demonstrates the effect of using a sheet comprising inorganic additives on the fire endurance of a wallboard. In addition, this Example illustrates the impact of inorganic particle size on the fire endurance of a wallboard. Specifically, inorganic compound aluminum trihydrate (ATH) was used as additive. Accordingly, a control board (sample E), a board comprising ATH with a particle size of about 10 μm (sample F), and a board comprising ATH with a particle size of about 1 μm (sample G) were tested using the Fire Endurance Index (FEI) small-scale testing device (FIG. 3).

Three individual 1 ft×1 ft gypsum board samples were prepared using the additives of Table 3, a water-to-stucco ratio of 1.9, and constructed using a laboratory casting device. The control sample (sample E) was made with a cellulosic sheet of 0.0161 inches thickness and 42.1 lbs/1000 ft$^2$ basis weight. The board had a thickness of 0.630 inches and a basis weight of 1632 lbs/1000 ft$^2$. Sample F was made using a cellulosic sheet of 0.0196 inches thickness and 51.6 lbs/1000 ft$^2$ basis weight, and comprised 16.34% ATH with a particle size of about 10 μm. The board had a thickness of 0.640 inches and a basis weight of 1617 lbs/1000 ft$^2$. ATH with a 10 μm particle size was purchased from Huber under the brand name Hymod® SB 432. Sample G was produced using a cellulosic sheet of 0.0184 inches thickness and 52.3 lbs/1000 ft$^2$ basis weight, and comprised 17.49% ATH with a particle size of about 1 μm. The board had a thickness of 0.638 inches and basis weight of 1631 lbs/1000 ft$^2$. ATH with a 1 μm particle size was purchased from Huber under the brand name Hydral® 710. The sheets described above for samples E, F, and G all had a thermal conductivity of 0.05 w/(m.k).

Figure 9:
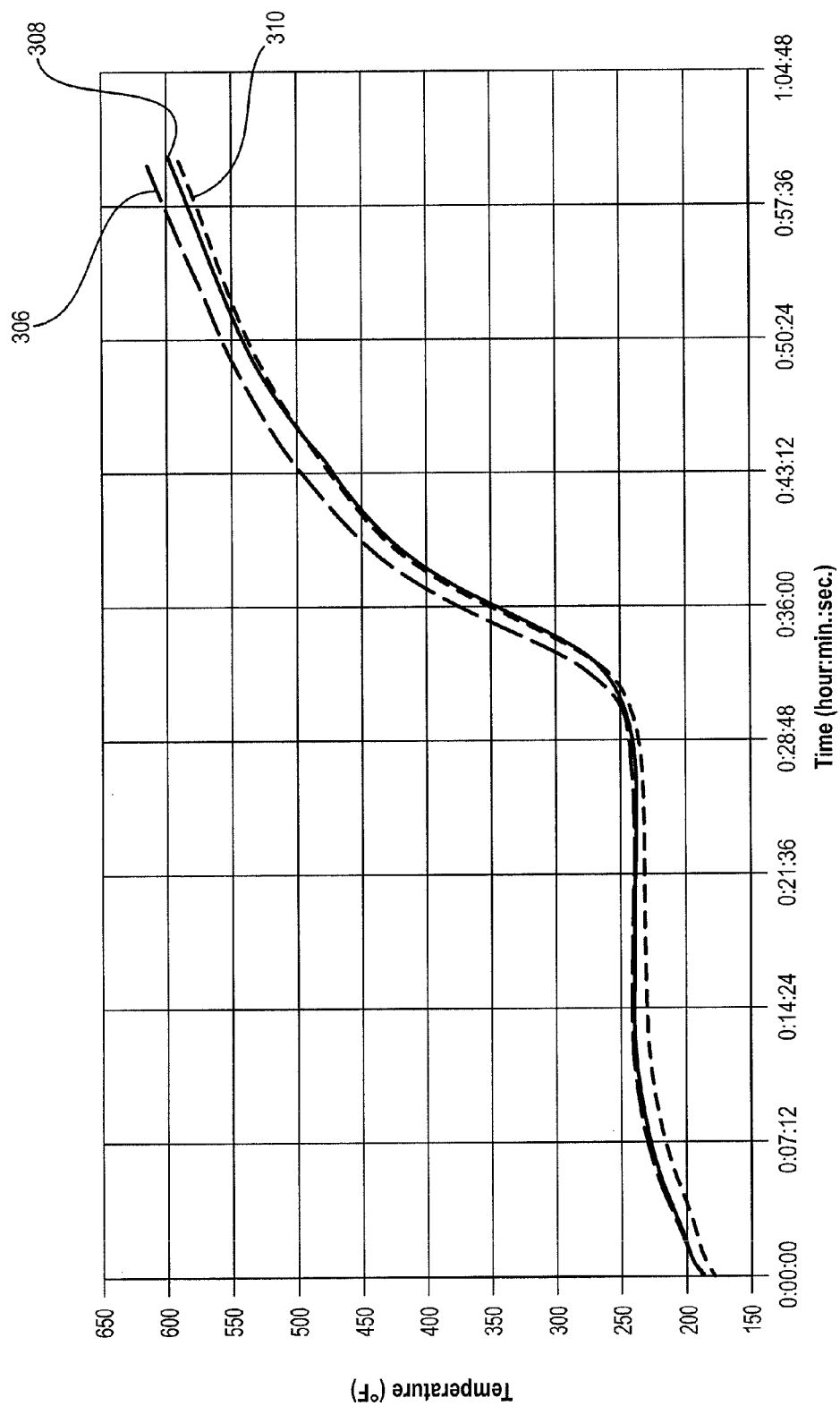
FIG. 9 is a line graph displaying the temperature of wallboard (Y-axis) over time (X-axis) for wallboards of Example 3 during a small-scale fire test in accordance with embodiments of the invention.

After casting, drying, and conditioning at ambient conditions for at least 24 hours, the board samples were cut into samples of 6.125 inches×6.625 inches. After the boards were allowed to condition at ambient conditions for at least another 24 hours, the boards were individually tested in the small-scale device (FIG. 3) to determine their respective Fire Endurance Index (FEI) where the cover sheet faced the door of the testing apparatus. Temperature traces for each of the three samples are shown in FIG. 9, where time is plotted along the horizontal axis and temperature of the back-face of each sample is plotted along the vertical axis. In the graph of FIG. 9, the long-dashed line 306 represents the temperature trace for the control (sample E), the solid line 308 represents the temperature trace for the board comprising a sheet with ATH (10 μm) (sample F), and the short-dashed line 310 represents the temperature trace for the board comprising a sheet with ATH (1 μm) (sample G).

As can be calculated from the graph of FIG. 9, the Fire Endurance Index was 57 minutes and 15 seconds for the control (sample E), 60 minutes 30 seconds for the sample comprising 16.34% ATH with a particle size of about 10 μm (sample F), and 61 minutes and 40 seconds for the sample comprising 17.49% ATH with a particle size of about 1 μm (sample G). In comparison with the control, the average increase in the Fire Endurance Index was about 3 minutes and 50 seconds. As demonstrated in FIG. 9, the temperatures were consistently lower when a sheet comprising ATH was used, indicating a slower heat transfer rate. In other words, the boards with a sheet comprising ATH (samples F and G) had greater fire endurance than the board comprising a sheet without ATH (sample E). Furthermore, the board comprising a sheet comprising ATH particles of about 1 μm (sample G) had a greater fire endurance than the board comprising a sheet comprising ATH particles of about 10 μm (sample F). This Example demonstrates that a sheet comprising ATH particles can increase the fire endurance of a gypsum wallboard.

Example 4

Surface Temperatures of U419 Test Assembly

This Example illustrates the effect of a thicker sheet facing the cavity of a wallboard assembly on the fire endurance of a U419 assembly design having no insulation in the cavity, with the thicker sheet facing the interior cavity. Accordingly, a control sample (sample H) and a sample with a thicker sheet facing the cavity (sample I) were tested in a standard U419 fire test. The boards and sheets were produced at a plant with the additives listed in Table 2, a water-to-stucco ratio of 0.91, a board thickness of 0.620 inches, basis weight of 1723 lbs/1000 ft$^2$, and density of 33.35 lbs/ft$^3$. Both boards were fitted with a cellulosic paper of 0.011 inches thickness, and 40 lbs/1000 ft$^2$ basis weight. To make sample I, an additional layer of cellulosic sheet was laminated onto one surface of the existing board using 3M™ Super 77™ adhesive. After lamination of sample I, the sheet had a total thickness of 0.022 inches and basis weight of 79 lbs/1000 ft². The amount of adhesive applied was approximately 3 lbs/1000 ft². The sheets described above for samples H and I had a thermal conductivity of 0.05 w/(m.k). The two boards used in the assembly were of the same weight and composition.

Figure 10:
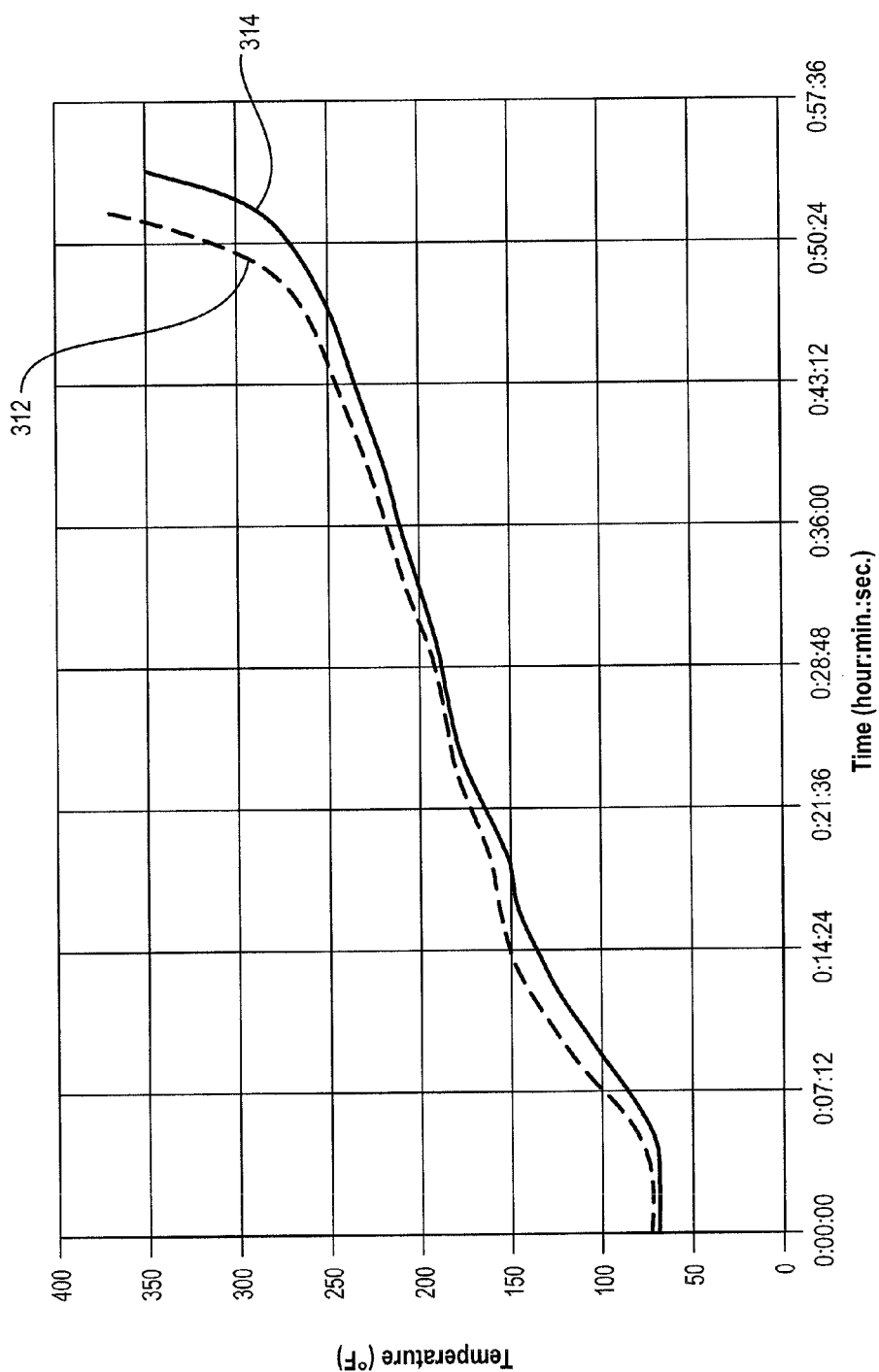
FIG. 10 is a line graph displaying the unexposed surface temperature (Y-axis) over time (X-axis) for wallboards of Example 4 during a standard fire test in accordance with embodiments of the invention.

A sample area of 100 ft² was heated according to ASTM E119-09 (2009). Temperature traces for each of the two samples are shown in FIG. 10, where time is plotted along the horizontal axis and temperature of the non-exposed sheet of each sample is plotted along the vertical axis. In FIG. 10, a dashed-line curve 312 represents the temperature trace for the control sample (sample H), and a solid-line curve 314 represents the temperature trace for the board comprising the thicker sheet (sample I). Based on the conditions of the test, it was determined that the control board (curve 312) had a fire endurance of 49 minutes and 53 seconds, while the sample I (curve 314) had a fire endurance of 53 minutes and 16 seconds. In other words, the treatment appeared to increase board endurance by about 3 minutes and 23 seconds.

This Example further demonstrates that a thicker sheet as described above increases the fire endurance of a gypsum wallboard. In addition, these results for a full scale test corroborate what was observed in the small scale test of Example 2.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Also, everywhere "comprising" (or its equivalent) is recited, the "comprising" is considered to incorporate "consisting essentially of" and "consisting of." Thus, an embodiment "comprising" (an) element(s) supports embodiments "consisting essentially of" and "consisting of" the recited element(s). Everywhere "consisting essentially of" is recited is considered to incorporate "consisting of." Thus, an embodiment "consisting essentially of" (an) element(s) supports embodiments "consisting of the recited element(s). Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A composite gypsum board comprising:
   a core comprising set gypsum formed from at least water and stucco, the core having a substantially flat shape and a generally uniform thickness, the core defining first and second board faces in opposing relation;
   a sheet disposed in bonding relation along the first board face, the sheet made of a material that has a thickness greater than about 0.014 inches, possesses a thermal conductivity that is less than about 0.1 w/(m.k.), and is applied to a back side of the composite gypsum board; and
   the composite gypsum board having a dry weight of less than about 2000 lbs/1000 ft² when at a thickness of about ⅝ inch.

2. The composite gypsum board of claim 1, wherein the sheet has a thickness from about 0.017 inches to about 0.023 inches.

3. The composite gypsum board of claim 1, wherein the sheet comprises cellulosic fiber.

4. The composite gypsum board of claim 1, wherein the sheet comprises cellulosic fiber, glass fiber, mineral wool, ceramic fiber, or a mixture thereof.

5. The composite gypsum board of claim 1, wherein the sheet further comprises an inorganic compound or a mixture of inorganic compounds with high crystallized water content.

6. The composite gypsum board of claim 5, wherein the inorganic compound is about 0.1% to about 30% by the total weight of the sheet.

7. The composite gypsum board of claim 5, wherein the inorganic compound is aluminum trihydrate.

8. The composite gypsum board of claim 7, wherein an amount of aluminum trihydrate is from about 5% to about 30% by total weight of the sheet.

9. The composite gypsum board of claim 5, wherein the inorganic compound is magnesium hydroxide.

10. The composite gypsum board of claim 1, wherein an additional sheet is laminated on the sheet using an adhesive.

11. The composite gypsum board of claim 1, wherein the composite gypsum board has a dry weight of less than about 1750 lbs/1000 ft² when at a thickness of about ⅝ inch.

12. The composite gypsum board of claim 1, wherein the composite gypsum board has a Fire Endurance Index (FEI) greater than 52 minutes and at least 3 minutes greater than a board comprising at least one cover sheet having a thickness less than about 0.014 inches.

13. The composite gypsum board of claim 1, wherein the composite gypsum board has a Fire Endurance Index (FEI) greater than 52 minutes and at least 4 minutes greater than a board comprising at least one cover sheet having a thickness less than about 0.014 inches.

14. The composite gypsum board of claim 1, wherein the composite gypsum board is built into a test assembly in accordance to UL U305, and has a fire rating of at least about 55 minutes when heated in accordance with the time-temperature curve of ASTM standard E119-09.

15. The composite gypsum board of claim 1, wherein the composite gypsum board is built into a test assembly in accordance to UL U305, and has a fire rating of at least about 60 minutes when heated in accordance with the time-temperature curve of ASTM standard E119-09.

16. The composite gypsum board of claim 1, wherein the composite gypsum board is built into a test assembly in accordance to UL U419 with fiberglass insulation, and has a fire rating of at least about 60 minutes when heated in accordance with the time-temperature curve of ASTM standard E119-09.

17. A method for making a composite gypsum board comprising a core comprising:
   forming a mixture of at least stucco and water to make stucco slurry,
   disposing the stucco slurry between two cover sheets and forming a flat, relatively uniform layer to create a continuous board preform,
   cutting the continuous board preform into the composite gypsum board of predetermined dimensions after the stucco slurry has hardened sufficiently for cutting, and
   drying the composite gypsum board;
   wherein at least one of the two cover sheets has a thickness greater than about 0.014 inches, and a thermal conductivity lower than about 0.1 w/(m.k.);
   the composite gypsum board having a dry weight of less than about 2000 lbs/1000 ft$^2$ when at a thickness of about ⅝ inch.

18. The method of claim 17, wherein at least one of the two cover sheets comprises cellulosic fiber.

19. The method of claim 17, wherein at least one of the two cover sheets comprises an inorganic compound or a mixture of inorganic compounds.

20. The method of claim 19, wherein the inorganic compound is aluminum trihydrate.

21. A composite gypsum board comprising:
   a set gypsum core disposed between first and second cover sheets;
   the second cover sheet having a thickness greater than about 0.014 inches, and a thermal conductivity of about 0.1 w/(m.k.) or less;
   the composite gypsum board having a dry weight of less than about 2000 lbs/1000 ft$^2$ when at a thickness of about ⅝ inch;
   such that when the composite gypsum board is disposed in a fire endurance index test apparatus having a heat source and the second cover sheet faces away from the heat source of the fire endurance index test apparatus, a Fire Endurance Index (FEI) of the composite gypsum board is greater than about 50 minutes.

22. A method for making a board, the method comprising:
   forming a mixture of at least stucco and water to make a slurry,
   disposing the slurry between two cover sheets to form a board preform,
   cutting the board preform into a board of predetermined dimensions after the slurry has hardened sufficiently for cutting, and
   drying the board;
   at least one of the two cover sheets having a thickness greater than about 0.014 inches and a thermal conductivity of about 0.1 w/(m.k.) or less;
   the board having a dry weight of less than about 2000 lbs/1000 ft$^2$ when at a thickness of about ⅝ inch;
   such that when the board is disposed in a fire endurance index test apparatus having a heat source, and at least one of the two cover sheets having a thickness greater than about 0.014 inches and a thermal conductivity of about 0.1 w/(m.k.) or less faces away from the heat source, the board has a Fire Endurance Index (FEI) greater than about 50 minutes.

23. A wall assembly comprising:
   a first board comprising a set gypsum core disposed between first and second cover sheets, the first and second cover sheets defining first and second board faces in opposing relation, the second cover sheet having a thickness greater than about 0.014 inches, and a thermal conductivity of about 0.1 w/(m.k.) or less;
   the first board having a dry weight of less than about 2000 lbs/1000 ft$^2$ when at a thickness of about ⅝ inch;
   a second board comprising a set gypsum core, the set gypsum core defining third and fourth board faces in opposing relation, the third and fourth board faces each optionally in association with a cover sheet; and
   the first and second boards defining an interior cavity of the wall assembly, the interior cavity between the first and second boards such that the second cover sheet faces the interior cavity.

* * * * *